Feb. 17, 1925.

G. A. ENGLUND 1,526,328

CHUCK

Filed Dec. 27, 1923

INVENTOR
Gustof A. Englund,
by
Harry P. Williams
atty.

Patented Feb. 17, 1925.

1,526,328

UNITED STATES PATENT OFFICE.

GUSTAF A. ENGLUND, OF WEST HARTFORD, CONNECTICUT, ASSIGNOR TO THE JACOBS MANUFACTURING COMPANY, OF HARTFORD, CONNECTICUT, A CORPORATION OF CONNECTICUT.

CHUCK.

Application filed December 27, 1923. Serial No. 682,936.

*To all whom it may concern:*

Be it known that I, GUSTAF A. ENGLUND, a citizen of the United States, residing at West Hartford, in the county of Hartford and State of Connecticut, have invented a new and useful Improvement in Chucks, of which the following is a specification.

This invention relates to the type of chuck illustrated and described in Patent #1,123,541 dated January 5, 1915, that is, a chuck in which the holding jaws are obliquely advanced for closing and obliquely retracted for opening, by means of an exterior rotatable sleeve that on its edge has bevel teeth and which is rotated on the body by a key having bevel teeth.

The object of the present invention is to increase the efficiency and lengthen the life of the operating means of chucks of this nature.

This object is attained by providing the edge of the sleeve with spiral teeth and forming the key teeth correspondingly, the curvature of the teeth being such that when engaged and the key is turned to effect the closing of the jaws the tendency of the angular engagement of the teeth is to draw the key inward, rather than cause the key to slip outward and become disengaged. This enables the operative to work fast as he does not have to exercise care in order to prevent the disengagement of the key when tightening the jaws on a tool or piece of work. Furthermore with teeth thus formed there is more than one tooth on the key engaged with the teeth on the sleeve, and this distributes the load over more surface thereby decreasing the liability of breaking the teeth when the jaws are set up hard, and lessening the wear of long use.

Figure 1:
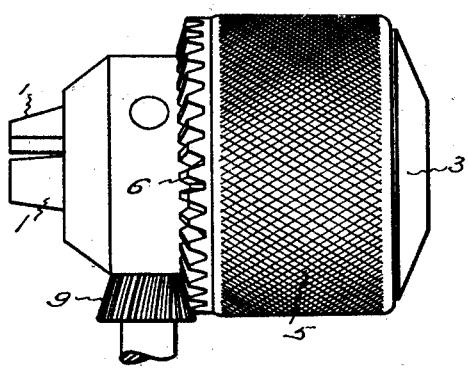
Figure 2:
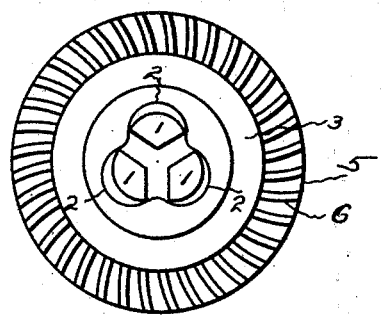
Figure 3:
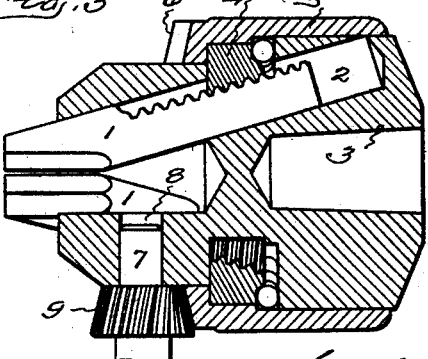

In the accompanying drawings Figure 1 shows a side view of a chuck and key of the type mentioned with the operating means formed according to this invention. Fig. 2 shows an end view of the chuck without the key. Fig. 3 is a longitudinal section of the chuck showing the key engaged with the operating sleeve.

In the chuck illustrated the jaws 1 are loosely arranged in bores 2 that extend obliquely with relation to the axis of the body 3. The backs of the jaws have teeth which are engaged by an internally threaded ring 4 that is fastened to and rotates with the sleeve 5 on the exterior of the body. Rotating the sleeve through the threaded ring causes the oblique reciprocation of the jaws for closing and opening in the usual manner.

The front edge of the sleeve is provided with bevel teeth 6 that in this case are formed as spiral teeth. The operating key has a stem 7 shaped to fit into a key socket 8 in the body. This key is in the form of a bevel pinion 9 having spiral teeth shaped to conform to the spiral bevel teeth on the edge of the sleeve.

When the key is inserted the end thrust of the spirally engaging teeth is such as to tend to draw the key inward rather than force it outward. The greater the power applied to the key the more the key tends to work in. As a result of this the operative may work rapidly without danger of the key slipping out when the jaws are tightened upon a tool or piece of work. When the key is turned in the opposite direction the sleeve is rotated so as to release the jaws and when the tool or work is free the key tends naturally to slip from engagement with the sleeve. With the teeth cut spirally more than one tooth is in engagement at a time when the key is in place and turned for closing the jaws. This increases the strength of the engagement and limits the liability of breaking the teeth when the jaws are closed tightly upon a tool or piece of work and as the load is distributed by the engagement of more than one tooth the wear on the teeth is lessened, thus ensuring a longer life for the chuck.

The invention claimed is:—

A chuck of the character described having an operating sleeve provided on its front edge with spiral bevel teeth and a key provided with corresponding spiral bevel teeth, the body of the chuck having a key socket adjacent to the end of the sleeve and the key having a stem adapted to fit said socket.

GUSTAF A. ENGLUND.